US009311761B1

United States Patent
Ye et al.

(10) Patent No.: US 9,311,761 B1
(45) Date of Patent: Apr. 12, 2016

(54) VEHICLE LOAD INFORMATION SYSTEM TO DETERMINE ROAD SLOPE AND LOAD WHEN TRAILER IS ADDED TO VEHICLE

(71) Applicant: Continental Automotive Systems, Inc., Auburn Hills, MI (US)

(72) Inventors: Bo Ye, Rochester Hills, MI (US); Michael G. Schneider, Troy, MI (US); Joshua Frankfurth, Rochester Hills, MI (US); Eric A. Matoy, Leonard, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 40 days.

(21) Appl. No.: 14/549,581

(22) Filed: Nov. 21, 2014

(51) Int. Cl.
*G07C 5/08* (2006.01)
*G07C 5/02* (2006.01)

(52) U.S. Cl.
CPC ............... *G07C 5/0808* (2013.01); *G07C 5/02* (2013.01); *G07C 5/085* (2013.01)

(58) Field of Classification Search
CPC ......... G07C 5/0808; G07C 5/02; G07C 5/085
USPC .......................................................... 701/94
See application file for complete search history.

(56) References Cited

U.S. PATENT DOCUMENTS

| | | | | |
|---|---|---|---|---|
| 4,850,656 A * | 7/1989 | Ise | ........................... | B60T 8/175 180/197 |
| 7,996,139 B2 * | 8/2011 | Okuda | ..................... | B60K 6/44 180/197 |
| 8,977,449 B2 * | 3/2015 | Gibson | ................. | B60W 20/00 701/54 |
| 2004/0238244 A1 * | 12/2004 | Amanuma | ............... | B60K 6/52 180/65.225 |
| 2005/0012501 A1 * | 1/2005 | Isono | ...................... | B60T 8/172 324/300 |
| 2005/0165549 A1 * | 7/2005 | Schneider | .............. | B60K 28/16 701/69 |
| 2008/0059021 A1 * | 3/2008 | Lu | ...................... | B60G 17/0195 701/36 |
| 2010/0268420 A1 * | 10/2010 | Yasui | .................. | B60T 8/17555 701/41 |

* cited by examiner

*Primary Examiner* — McDieunel Marc
*Assistant Examiner* — James E Stroud

(57) ABSTRACT

A method identifies, for a vehicle, a low friction surface from a road surface with a slope. With the vehicle at standstill, the vehicle ignition is switched on. A normal load for the vehicle is calculated. It is determined if the vehicle is moving, and if the vehicle is moving, a vehicle load is calculated using suspension information from the vehicle. A road slope angle is calculated based on the calculated vehicle load and calculated normal load. A normal slope angle is calculated and is compared to the calculated road slope angle to determine if the vehicle is on a low friction surface or on a sloped surface. In accordance with another aspect of an embodiment, a method determines whether a trailer is coupled to a vehicle.

21 Claims, 5 Drawing Sheets

VEHICLE LOAD INFORMATION SYSTEM TO DETERMINE ROAD SLOPE AND LOAD WHEN TRAILER IS ADDED TO VEHICLE

FIELD

The invention relates to a vehicle having an Electronic Stability Control (ESC) system and, more particularly, to system that utilizes vehicle load information to determine the road slope and also to determine vehicle load due to adding a trailer.

BACKGROUND

For conventional all-wheel drive (AWD) or 4×4 ESC systems, it is very difficult to identify low friction surfaces from surfaces with road slopes. Thus, it is difficult to identify low friction surfaces and downhill surfaces during traction control system (TCS) control. Even with the help from an accelerometer, it is very easy to falsely determine a slope on a low friction surfaces when wheels are slipping together with almost identical speeds. This will lead to incorrect estimated vehicle reference velocity. The conventional solution will normally require an AWD module to open a clutch or apply brake torque, distributed to the wheels, to try to slow down the over spinning wheels to correct the vehicle reference velocity. This conventional solution will introduce brake noise or uncomfortable engine control or switch the system from AWD to basically 2WD (with clutch open) on low friction surfaces.

In addition, conventional systems using sensors and algorithms detect the load for the entire vehicle. However, such systems do not detect if a part of the load is due to a trailer being towed and how this load is distributed. Therefore, it is not possible to optimize Electronic Braking System (EBS) functions for a specific driving situation.

Thus, there is a need for to provide a system that gives a more accurate vehicle reference velocity without need to open a clutch, thus providing more traction, and to provide a system that determines the vehicle load, particularly when a trailer is added to the vehicle, so as to optimize EBS functions for a specific driving situation.

SUMMARY

An objective of the invention is to fulfill the need referred to above. In accordance with the principles of an embodiment, this objective is obtained by providing a method of identifying, for a vehicle, a low friction surface from a road surface with a slope. With the vehicle at standstill, the vehicle ignition is switched on. A normal load for the vehicle is calculated. It is determined if the vehicle is moving, and if the vehicle is moving, a vehicle load is calculated using suspension information from the vehicle. A road slope angle is calculated based on the calculated vehicle load and calculated normal load. A normal slope angle is calculated and is compared to the calculated road slope angle to determine if the vehicle is on a low friction surface or on a sloped surface.

In accordance with another aspect of an embodiment, a method determines whether a trailer is coupled to a vehicle. The vehicle has front and rear axles. The method determines an empty weight of a vehicle. A total combined operating weight associated with the vehicle is determined. Load on the front and rear axles or front and rear wheels is determined. Weight distribution on the vehicle is calculated. If a trailer is coupled to the vehicle, the weight of the trailer and a tongue weight are calculated.

Other objectives, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXEMPLARY EMBODIMENTS

Figure 1:
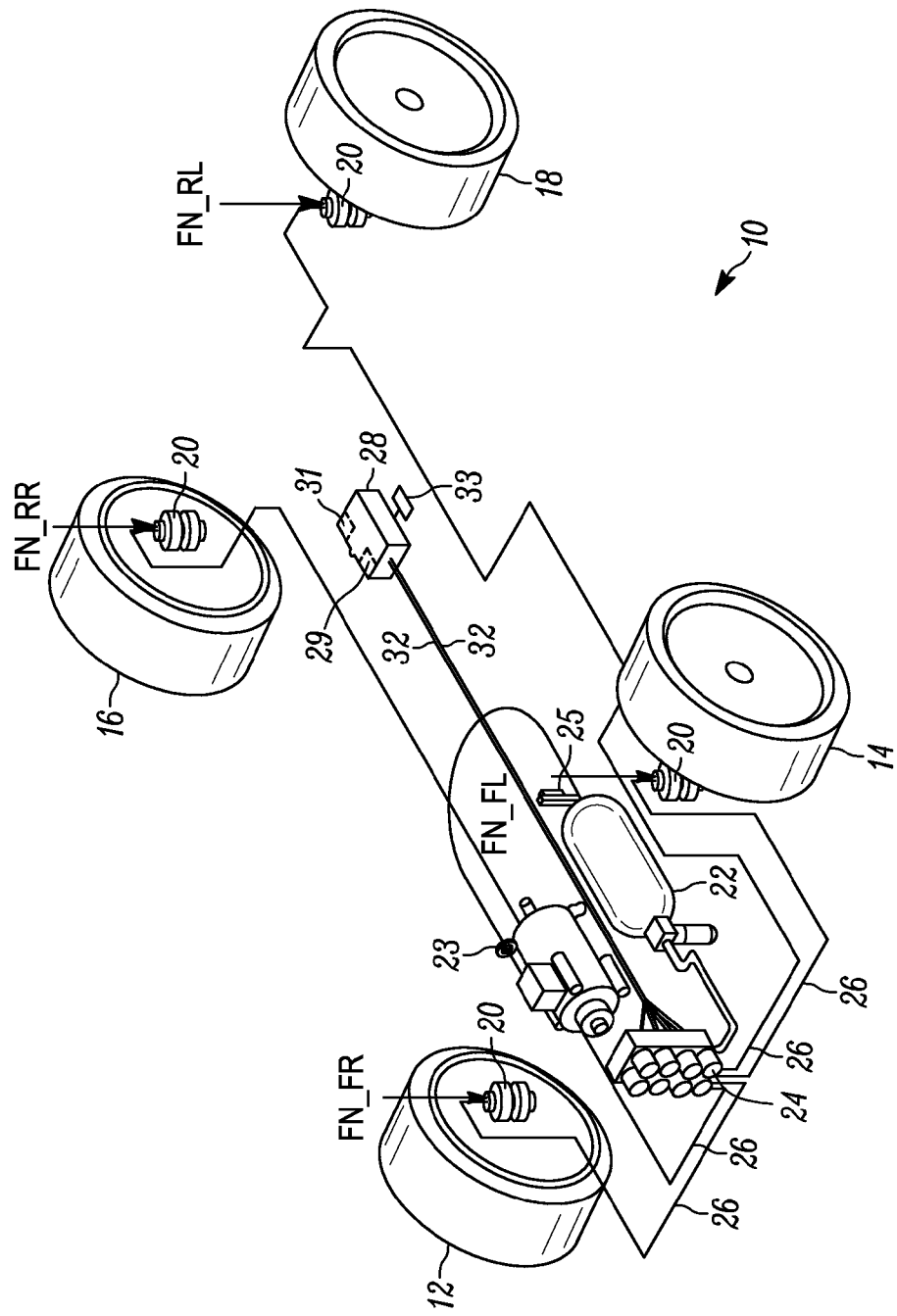
FIG. 1 is schematic view of an air suspension system of a vehicle provided in accordance with an embodiment, showing forces on the wheels.

With reference to FIG. 1, an air suspension system for a vehicle 11 (FIG. 2) is shown, generally indicated at 10, in accordance with an embodiment. The vehicle has a front right wheel 12, a front left wheel 14, a rear right wheel 16 and rear left wheel 18. A conventional suspension such as an air bellow 20 is associated with a respective wheel. An air tank 22 provides a source of air to the bellows 20. A pump 23 supplies the air tank 22 through a pressure switch 25. The air tank 22 is in fluid communication with a solenoid valve manifold 24, with the manifold 24 controlling the delivery of air to the air bellows 20 via piping 26. A control unit 28, including a processor circuit 29, controls the solenoid valve manifold 24 via electrical signal lines 32.

The control unit 28 can obtain real time load information on all four wheels, which represents the normal force (i.e., FN_FL, FN_FR, FN_RL and FN_RR) applied to each wheel. The total normal force FN_total can be calculated by summing these individual forces together. The nominal normal force FN_norm can be obtained once the ignition is switched on and vehicle is standing still. If vehicle stands still on a slope when ignition is switched on, a slope compensation can be obtained by using accelerometer-sensor information to get the nominal normal force when vehicle starts.

Figure 2:
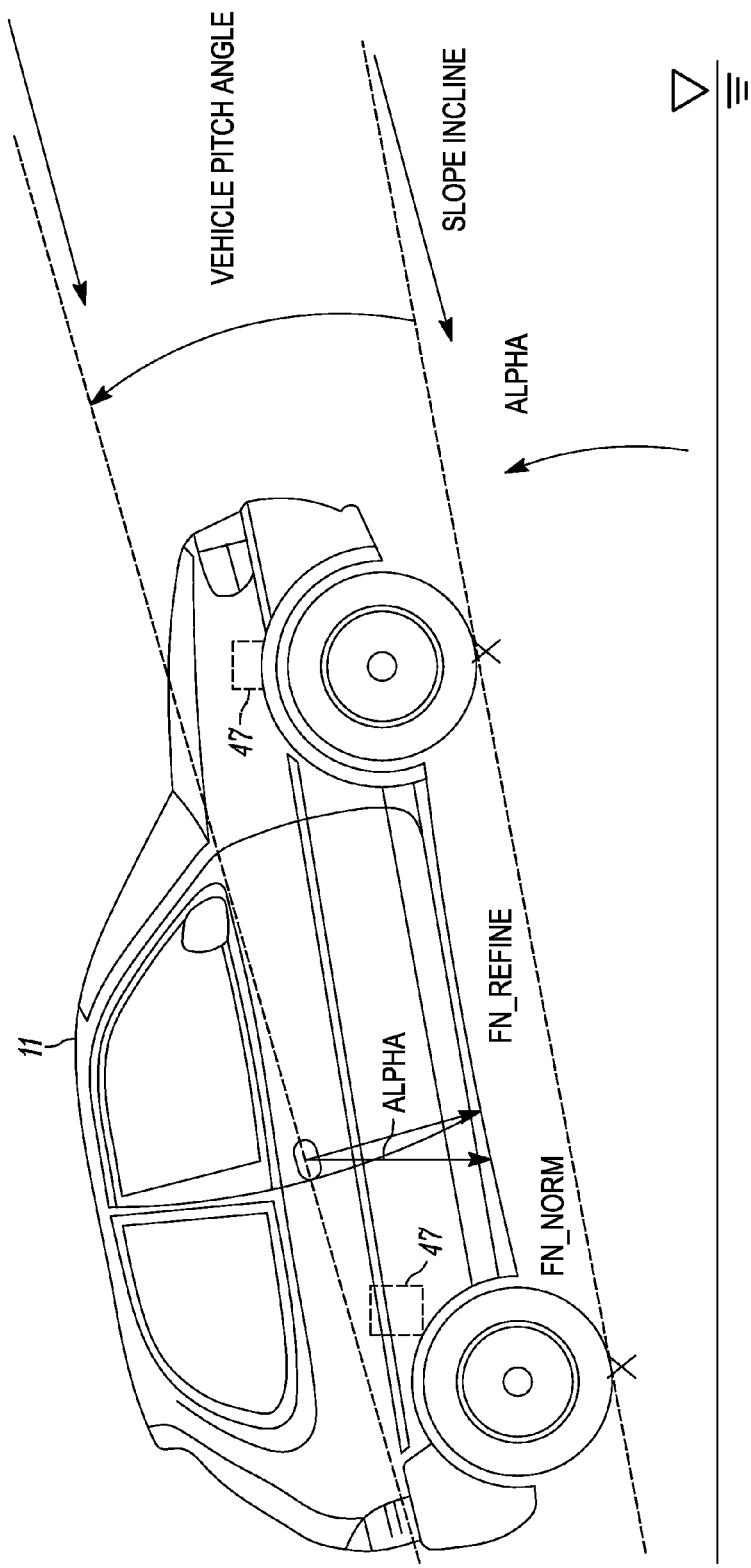
FIG. 2 is a view of a vehicle on a slope with an angle Alpha and the forces on the vehicle, which are employed in calculations for the ESC system of FIG. 1.

With reference to FIG. 2, if the vehicle 11 is driving on a road slope with a slope angle Alpha, the normal force on each wheel will be influenced by the slopes. If vehicle is driving with constant speed in a perfect situation, the new normal force obtained from the control unit 28 will be close to nominal normal force*cosine(Alpha). In a real world situation, the new normal force for each wheel is influenced by vehicle acceleration, lateral acceleration, vehicle pitching angle etc.

However, the load transfer caused by vehicle acceleration and lateral acceleration should have no influence on the total normal force FN_total.

In accordance with an embodiment, a vehicle pitching factor is employed to remove the influence of vehicle pitching angle change on road slopes, which gives a more refined normal force FN_refined as shown in FIG. 2. The cosine value the slope cosine(Alpha) can then be calculated by using FN_refined/FN_norm. Then the slope angle Alpha can be obtained. By comparing the slope angle calculated from this method and the difference between wheel acceleration and accelerometer-sensor information, a much more accurate slope can be estimated and used to calculate the vehicle reference velocity.

Figure 3:
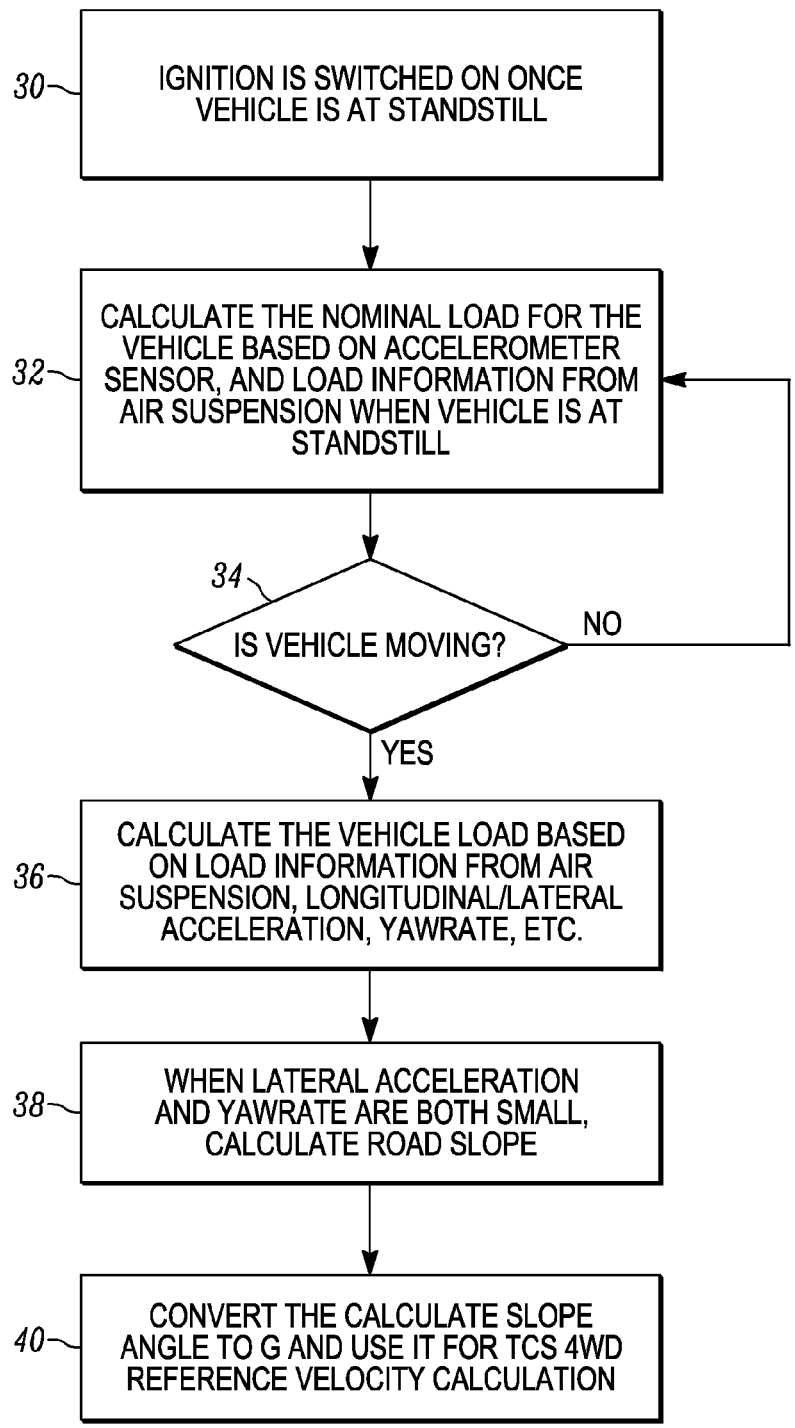
FIG. 3 is a flow chart of a method of an embodiment.

More specifically, with reference to FIG. 3, the steps or algorithm for identifying a low friction surface from a road surface with a slope is shown. In step 30, the ignition is switched on once the vehicle 11 is at standstill. In step 32, the Normal Load for the vehicle is calculated based on information from an accelerometer 33, and the load information from the air suspension 20 when the vehicle is at standstill. Thus, assuming the bad information received from air suspension for each wheel is FN_FL—0/FN_FR_0/FN_RL_0/FN_RR_0 at standstill and the accelerometer information is A_0 (with unit g) at standstill, the normal vehicle load is FN_norm=(FN_FL_0+FN_FR_0+FN_RL_0+FN_RR_0)*cos(a tan(A_0)). It is determined if the vehicle 11 is moving in step 34. If the vehicle is not moving, the method returns to step 32. If the vehicle is moving, the method proceeds to step 36 where the Vehicle Load is calculated based on load information from the air suspension, longitudinal/lateral acceleration, yaw rate, etc. Thus, Vehicle Load FN_refined=FN_FL+FN_FR+FN_RL+FN_RR. Logic in processor circuit 29 can be used to improve the accuracy of FN_refined by considering the impact of longitudinal/lateral acceleration of the vehicle, yaw rate of the vehicle, and also the change within FN_FL/FN_FR/FN_RL/FN_RR.

In step 38, when the lateral acceleration and yaw rate are both small, the road slope angle is calculated. Assuming the calculated slope angle is Alpha, then Cos(Alpha)=FN_refined/FN_norm. Alpha=a cos(FN_refined/FN_norm), which is the arc cosine of (FN_refined/FN_norm). When the absolute values of lateral acceleration and yaw rate are small, the influence of possible bank angle will be small. In step 40, the calculated slope angle is converted to acceleration (g) and is used for TCS 4WD reference velocity calculation. The normal slope calculation in the software of the EBS 60 (see FIG. 6) is calculated from the difference of average wheel speed acceleration and longitudinal acceleration information from the accelerometer 33. By comparing this normal slope calculation to the road slope angle obtained using the air suspension information from step 36, a possible low friction surface can be identified versus a downhill slope surface, which will improve the calculation of TCS reference velocity for an AWD vehicle.

Figure 4:
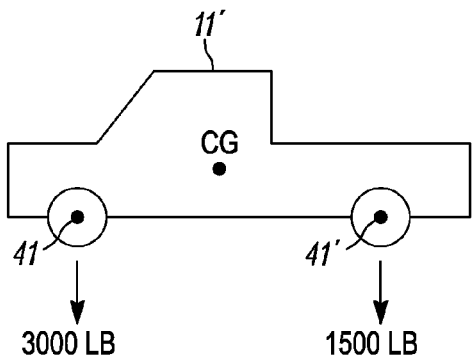
FIG. 4 is a view of a truck in an unloaded condition and showing the forces thereon.
Figure 5:
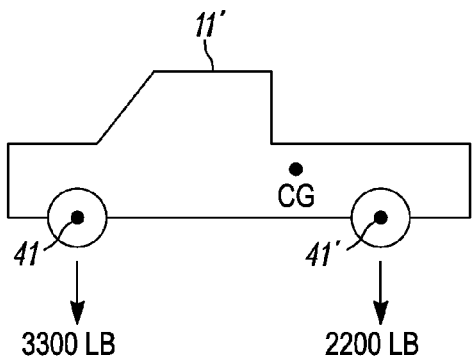
FIG. 5 is a view of the truck of FIG. 4 in a loaded condition and showing the forces thereon.
Figure 6:
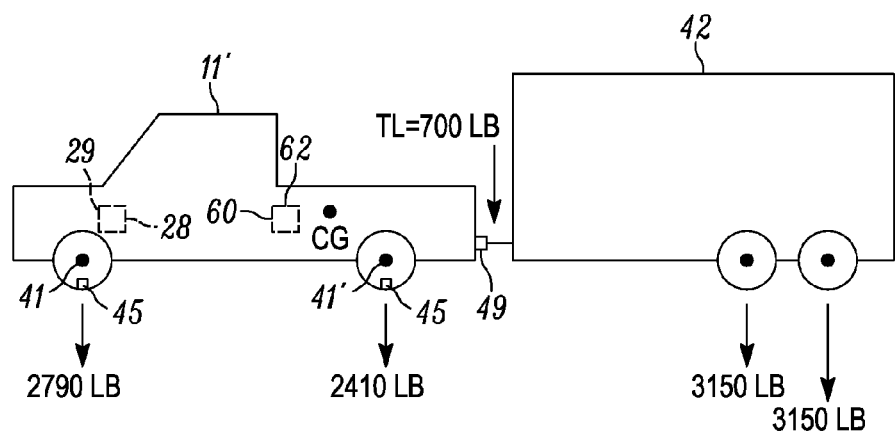
FIG. 6 is a view of the truck of FIG. 4 shown towing a trailer and showing the forces thereon.

With reference to FIGS. 4-6, another aspect of an embodiment will be explained. A vehicle or truck 11' is shown in FIG. 4 in an unloaded (empty bed) condition showing the center of gravity CG and the forces on the axles 41 and 41'. The truck 11' has the air suspension system 10 of FIG. 1. FIG. 5 shows the truck 11' in a loaded (full bed) condition showing the center of gravity CG shifted rearwardly of the truck 11'. The load is applied to both axles 41 and 41'. The total load has increased 1000 lbs. from that of FIG. 4. With reference to FIG. 6, when a trailer 42 is added to the truck 11', the trailer tongue load TL (e.g. of 700 lbs.) exerted behind the rear axle 41' decreases the load on the steering axle 41. This change in the steering axle load in FIG. 5 from that shown in FIG. 4 or FIG. 5 is used to determine tongue load TL.

Figure 7:
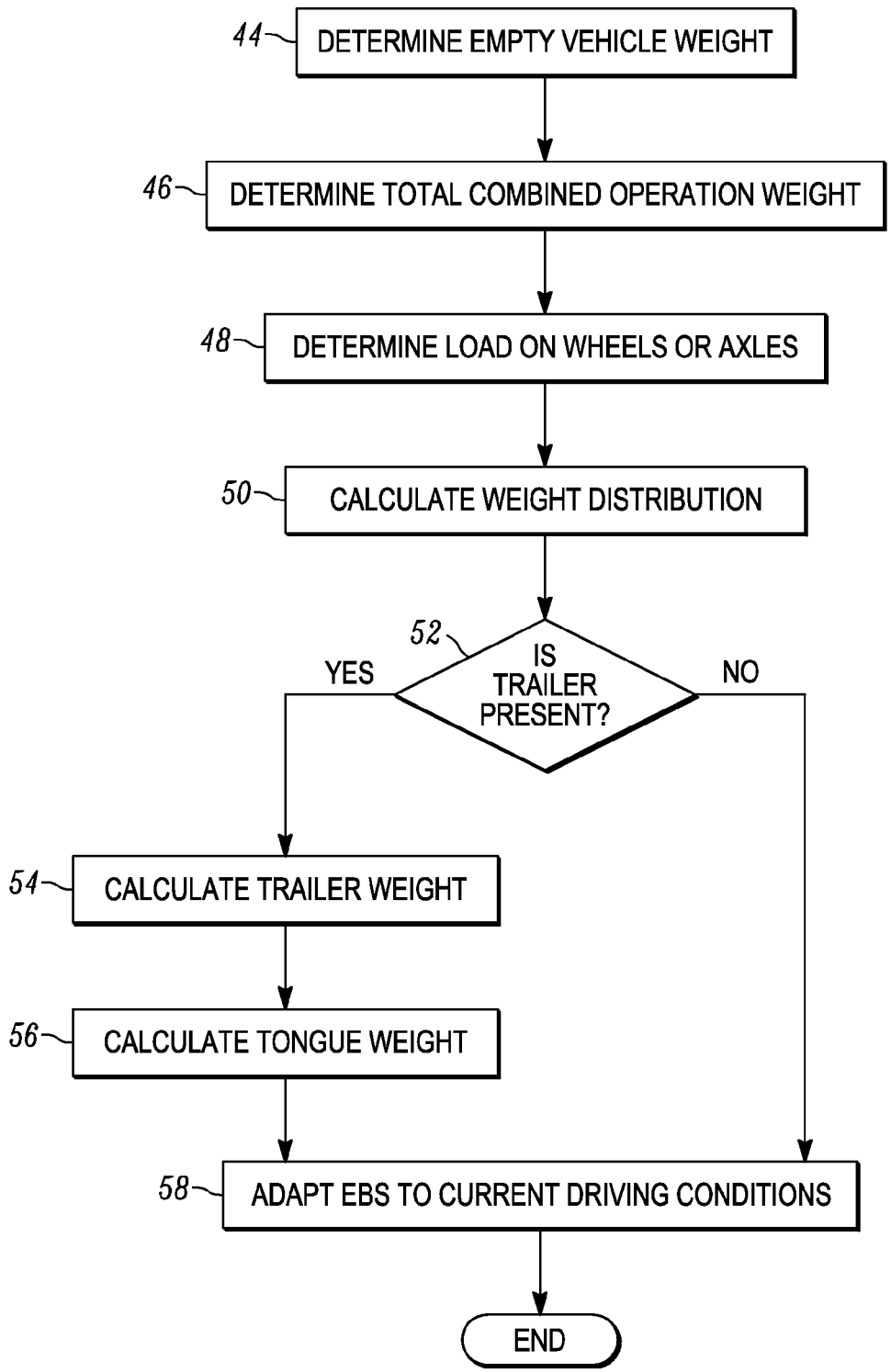
FIG. 7 is a flowchart showing the steps of calculating tongue weight, when a vehicle is towing a trailer, in accordance with an embodiment.

With reference to FIG. 7, the steps or algorithm for determining the tongue load TL are shown with reference to the vehicle 11 and trailer 42 of FIG. 6. In step 44, the weight of the empty vehicle 11' is determined. This is a fixed known value and can be provided by CAN bus message, a preprogrammed parameter in processor circuit 29, etc. In step 46, the total combined operating weight associated with the vehicle is determined. This includes the vehicle 11' weight, the weight of the trailer 42 if present, plus anything in or on the vehicle 11'. This operating weight can be obtained by conventional technology based on engine torque and acceleration.

Next, in step 48, the load on the wheels or axles 41, 41' is determined. In accordance with an embodiment, this load can obtained by using a smart tire sensor 45 (FIG. 6) that measures load, or can be calculated from pressure sensors in the suspension air springs 20 (FIG. 1), or can be calculated by mechanical suspension spring deflection obtained by a ride height sensor 47 (FIG. 2), or can be obtained from other methods that provide the load. In step 50, the weight distribution on the vehicle is calculated. The sensors 45, 20, or 47 for obtaining loads can be part of a load monitoring system of the embodiment.

The actual operating weight minus the empty weight of the vehicle is equal to the payload. The determined front axle weight (from step 48) minus the empty front axle weight (from step 44) defines delta_front_axle weight and the determined rear axle weight (from step 48) minus the empty rear axle weight (from step 44) defines delta_rear_axle weight. Step 52 determines if a trailer 42 is coupled to the hitch 49 of the vehicle 11'. This can be determined since, if delta_front_axle weight plus delta_rear_axle weight equals the payload, then no trailer is present and the process proceeds to step 58 where the EBS 60 adapts to the current driving conditions without a trailer present. If delta_front_axle weight plus delta_rear_axle weight does not equal the payload, then a trailer is present and the trailer weight is calculated in step 54. The trailer weight is equal to the total combined weight obtained in step 46 minus the actual weight (load) on each axle or wheel as obtained from step 48. Next, in step 56, the tongue weight is calculated. Thus, tongue weight TL= (delta_front_axle weight*wheel base)/distance from hitch 49 to rear axle 34'. The wheel base of the vehicle 11' and the hitch location are known. Delta_front_axle weight is obtained from step 50.

Thus, when vehicle load information is combined with information derived from the suspension (such as ride height sensors on mechanical systems or air pressure on air springs) or from tire pressure monitoring systems, it is possible to calculate the tongue load TL from the trailer as well as the trailer weight. In step 58, the calculation of the tongue load TL and the trailer weight allows the functions of the EBS 60 to be adapted to the current driving situation. For example, EBS 60 with processor circuit 62 can: prevent false trailer sway activations when a trailer is not present and tighter control when it is; change brake force distribution between the towing vehicle and trailer (control the trailer brake gain and force vs. decal curve of towing vehicle); change ARP/ESC thresholds and gains (gains can be desensitized for some situations and more sensitive in other critical situations). The EBS 60 can be of the type disclosed in U.S. Pat. No. 8,606,477, the content of which is hereby incorporated by reference into this specification.

The embodiment can be combined with other technologies (rear facing camera, blind spot monitoring, etc.) to increase the confidence and accuracy.

The operations and algorithms described herein can be implemented as executable code within the control unit 28 processor circuit 29 and/or the EBS 60 with processor circuit 62 as described, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 31) causes the integrated circuit(s) implementing the processor circuit 29 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 31 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of identifying, for a vehicle, a low friction surface from a road surface with a slope, the method comprising the steps of: with the vehicle at standstill, turning the vehicle ignition switched on, calculating, in a control unit, a normal load for the vehicle, determining if the vehicle remains at standstill or is moving, and if the vehicle is moving, calculating, in the control unit, a vehicle load using suspension information obtained from the vehicle, calculating, in the control unit, a road slope angle based on the calculated vehicle load and calculated normal load, calculating, in the control unit, a normal slope angle, and comparing, in the control unit, the normal slope angle to the calculated road slope angle to determine if the vehicle is on a low friction surface or on a sloped surface.

2. The method of claim 1, wherein the step of calculating the normal load includes using accelerometer information and load information from an air suspension of the vehicle when the vehicle is at standstill.

3. The method of claim 1, wherein the step of calculating the vehicle load is based on load information from an air suspension of the vehicle, longitudinal and/or lateral acceleration, and yaw rate of the vehicle.

4. The method of claim 1, wherein after the step of calculating the road slope angle, the method further comprises: converting, in the control unit, the calculated slope angle to acceleration, and wherein the step of calculating the normal slope angle is based on a difference of average wheel speed acceleration and longitudinal acceleration information of the vehicle.

5. The method of claim 2, wherein the vehicle has four wheels and the step of calculating the normal load comprises:
defining load information received from a suspension for each wheel as FN_FL_0/FN_FR_0/FN_RL_0/FN_RR_0 at standstill, and defining accelerometer information from the vehicle as A_0 (with unit g) at standstill, and
calculating, in the apparatus, the normal load as FN_norm=(FN_FL_0+FN_FR_0+FN_RL_0+FN_RR_0)*cos(a tan(A_0)).

6. The method of claim 5, further comprising:
calculating, in the apparatus, the vehicle load as FN_refined=FN_FL+FN_FR+FN_RL+FN_RR.

7. The method of claim 6, further comprising:
calculating, in the apparatus, the slope angle Alpha as Alpha=arc cosine (FN_refined/FN_norm).

8. The method of claim 1, further comprising:
calculating, in an apparatus, a reference velocity of the vehicle based on whether the vehicle is on a low friction surface or on a sloped surface.

9. The method of claim 1, wherein the control unit has a processor circuit.

10. A method of determining whether a trailer is coupled to a vehicle, the vehicle having front and rear axles, the method comprising the step of: determining, in a control unit, an empty weight of a vehicle, determining, in the control unit, a total combined operating weight associated with the vehicle, determining, in the control unit, load on the front and rear axles or front and rear wheels, calculating, in the control unit, weight distribution on the vehicle, and determining, in a control unit, if a trailer is coupled to the vehicle, and if a trailer is coupled to the vehicle, calculating the weight of the trailer and calculating a tongue weight.

11. The method of claim 10, wherein when a trailer is coupled to the vehicle, the method further comprises:
operating an electronic braking system of the vehicle in response to the trailer weight and the tongue weight.

12. The method of claim 10, wherein, when a trailer is not coupled to the vehicle, the method further comprises:
operating an electronic braking system based on vehicle load only.

13. The method of claim 10, wherein the step of determining load comprises:
monitoring tire pressure sensors, associated with the wheels, which measure load.

14. The method of claim 10, wherein the step of determining load comprises:
monitoring pressure of suspension air springs associated with the wheels or using ride height sensors to monitor suspension spring defection.

15. The method of claim 10, wherein the step of determining load comprises:
obtaining the load from a CAN bus message.

16. The method of claim 10, wherein the step of calculating weight distribution on the vehicle comprises: establishing, in the control unit, a delta_front_axle weight as the front axle weight, obtained from the determining load step, minus the empty front axle weight, obtained from the determining empty weight step, and establishing, in the control unit, a delta_rear_axle weight as the rear axle weight, obtained from the determining load step, minus the empty rear axle weight, obtained from the determining empty weight step.

17. The method of claim 16, wherein the step of determining if a trailer is coupled to the vehicle comprises: determining, in the control unit, payload of the vehicle to be the operating weight minus the empty weight of the vehicle, and if the delta_rear_axle weight plus delta_front_axle weight is equal to the payload, determining, in the control unit, that a trailer is coupled to the vehicle.

18. The method of claim 17, wherein the step of calculating a tongue weight comprises: multiplying, in the control unit, the delta_front_axle weight to wheel base of the vehicle and dividing the product thereof by a distance from a hitch of the vehicle to the rear axle.

19. A load monitoring system for determining whether a trailer is coupled to a vehicle so as to optimize an electronic braking system, the load monitoring system comprising:
sensors constructed and arranged to obtain load information from the vehicle, and
a control unit having a processor circuit constructed and arranged to determine loads on the front and rear axles or front and rear wheels of the vehicle and to determine if a trailer is coupled to the vehicle, and if a trailer is coupled to the vehicle, to calculate the weight of the trailer and tongue weight.

20. The system of claim 19, wherein sensors comprise tire pressure sensors, associated with the wheels, constructed and arranged to measure load, or pressure sensors of suspension air springs associated with the wheels, or ride height sensors constructed and arranged to monitor suspension spring defection.

21. The system of claim 19, in combination with the electronic braking system, the electronic braking system being constructed and arranged to adapt to current driving conditions based on the load information.

* * * * *